United States Patent
Winokur (10) Patent No.: US 8,539,172 B1
(45) Date of Patent: Sep. 17, 2013

(54) SYSTEM AND METHOD FOR ACCESSING DATA IN AN EXTERNAL VIRTUAL MEMORY

(75) Inventor: Alex Winokur, Haifa (IL)

(73) Assignee: Infinidat Ltd., Herzliya (IL)

( * ) Notice: Subject to any disclaimer, the term of this patent is extended or adjusted under 35 U.S.C. 154(b) by 259 days.

(21) Appl. No.: 12/941,246

(22) Filed: Nov. 8, 2010

(51) Int. Cl.
*G06F 12/00* (2006.01)

(52) U.S. Cl.
USPC ............... 711/154; 711/162; 711/E12.001; 711/E12.003

(58) Field of Classification Search
USPC ................ 711/154, 162, E12.001, E12.103
See application file for complete search history.

(56) References Cited

U.S. PATENT DOCUMENTS

| | | |
|---|---|---|
| 5,584,008 A | 12/1996 | Shimada et al. |
| 5,673,382 A | 9/1997 | Cannon et al. |
| 6,954,768 B2 | 10/2005 | Carlson et al. |
| 7,143,235 B1 * | 11/2006 | Watanabe et al. ............ 711/114 |
| 7,275,103 B1 | 9/2007 | Thrasher et al. |
| 7,584,340 B1 * | 9/2009 | Colgrove ....................... 711/163 |
| 7,783,847 B2 | 8/2010 | Moore et al. |
| 2004/0068636 A1 | 4/2004 | Jacobson et al. |
| 2004/0153606 A1 | 8/2004 | Schott |
| 2004/0260965 A1 * | 12/2004 | Kelman ............................ 714/2 |
| 2007/0043705 A1 * | 2/2007 | Kaushik et al. .................. 707/3 |
| 2007/0067583 A1 | 3/2007 | Zohar et al. |
| 2008/0016121 A1 | 1/2008 | Revah et al. |
| 2009/0019251 A1 | 1/2009 | Helman et al. |
| 2009/0089462 A1 * | 4/2009 | Strutt ............................. 710/16 |

FOREIGN PATENT DOCUMENTS

WO  WO 2010/085228 A1  7/2010

OTHER PUBLICATIONS

U.S. Appl. No. 13/004,947, filed Jan. 12, 2011, titled "Storage System and Method of Operating Thereof".
Symantec, "Veritas CommandCentral™-Supporting the Virtual Enterprise," *White Paper: Storage Management*, Apr. 2009.
U.S. Appl. No. 12/957,613, filed Dec. 1, 2010 in the name of Alex Winokur.
U.S. Appl. No. 13/008,373, filed Jan. 18, 2011 in the name of Alex Winokur.
U.S. Appl. No. 13/081,963, filed Apr. 7, 2011 in the name of Alex Winokur.

* cited by examiner

*Primary Examiner* — Larry Mackall
(74) *Attorney, Agent, or Firm* — Wiggin and Dana LLP; Gregory S. Rosenblatt (57) ABSTRACT

A method is provided for accessing data in an external virtual memory. A host receives from a storage manager a created handle for autonomous access of a volume. The volume forms part of accessible volumes in the virtual memory. The host autonomously provisions the handle to a selected volume from among the accessible volumes, and the host accesses the selected volume through the handle.

31 Claims, 7 Drawing Sheets

SYSTEM AND METHOD FOR ACCESSING DATA IN AN EXTERNAL VIRTUAL MEMORY

FIELD OF THE INVENTION

This invention relates to the field of memory management.

BACKGROUND OF THE INVENTION

Figure 1:
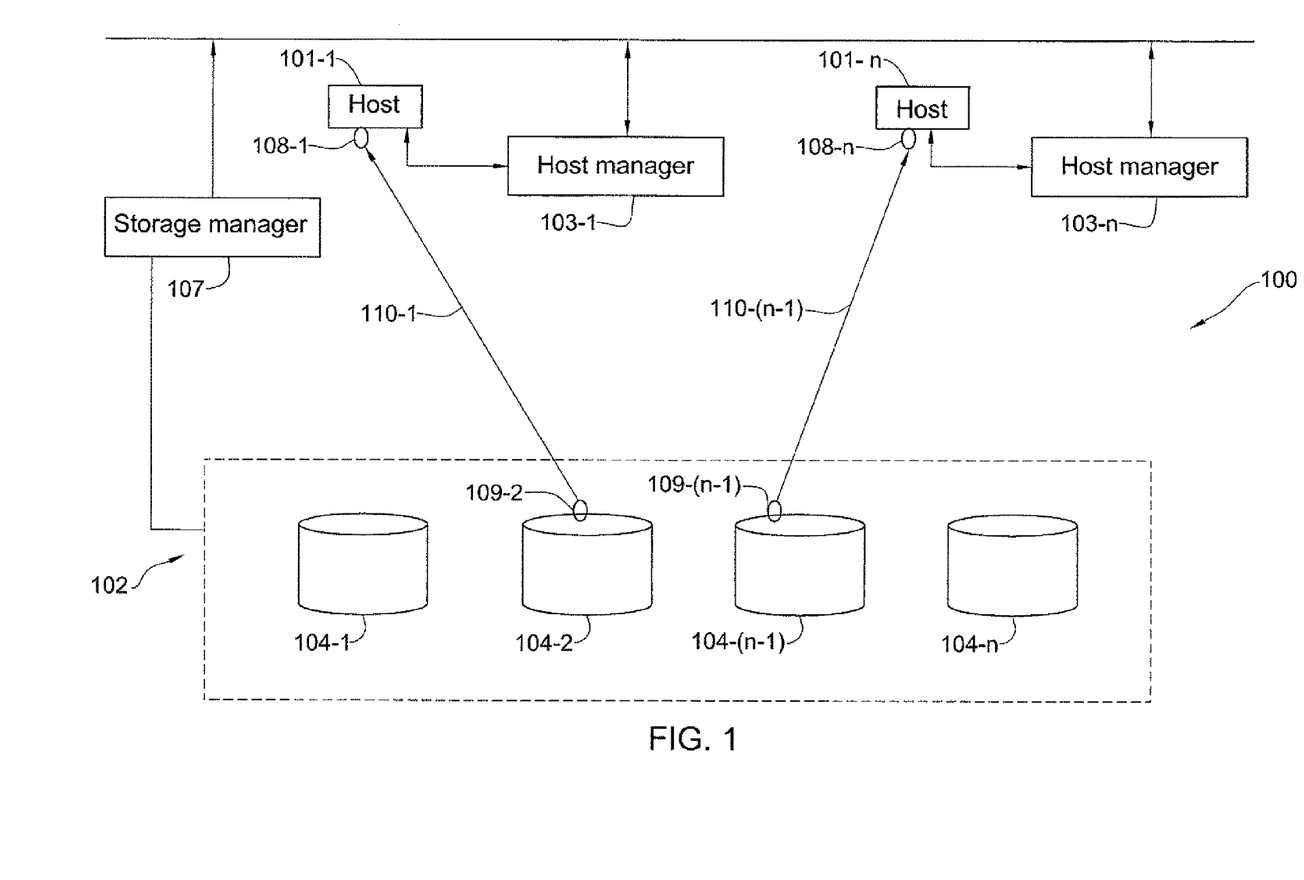
FIG. 1 is a schematic illustration of an exemplary prior art system for accessing data in an external virtual memory.
Figure 2:
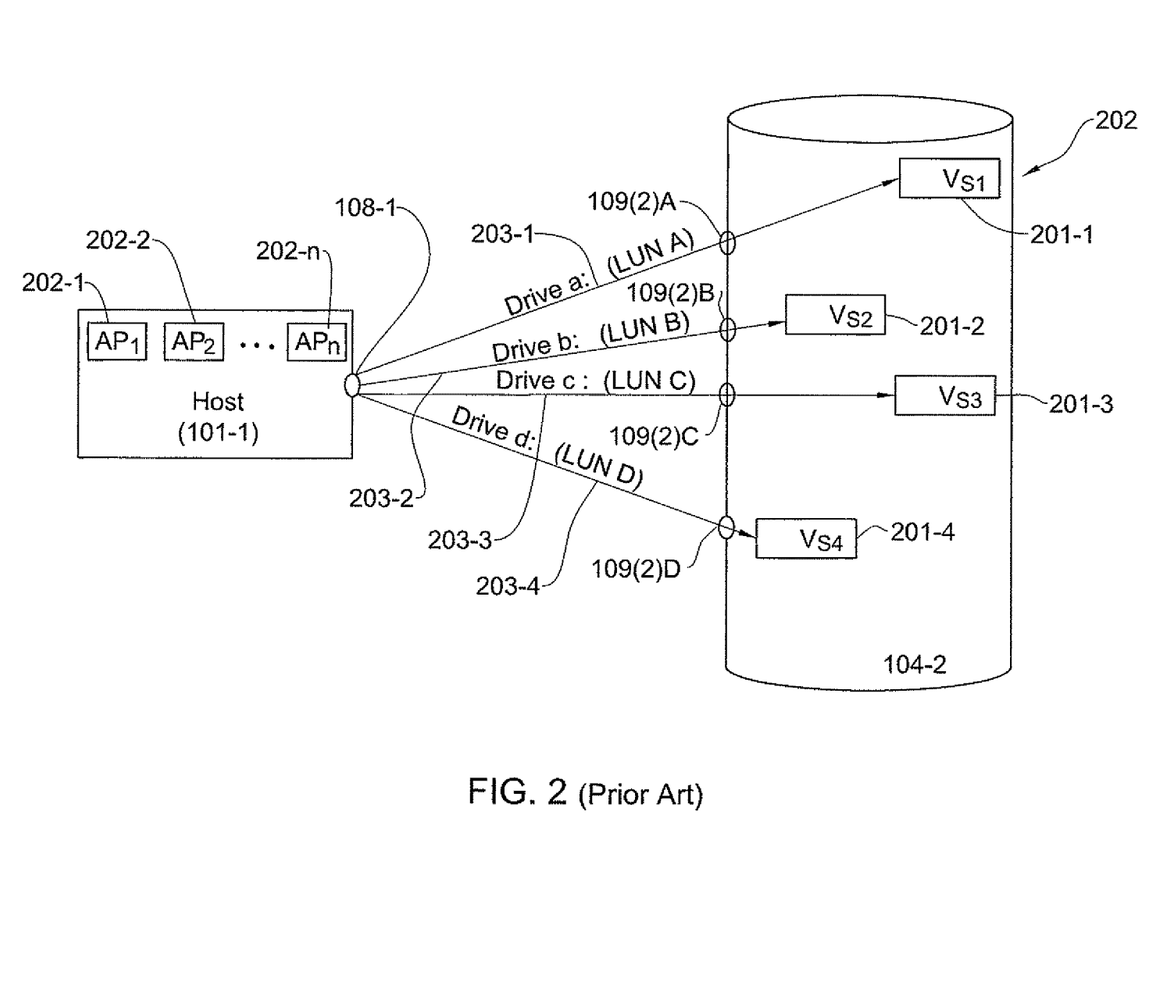
FIG. 2 is a schematic illustration of a host associated with a few volumes by means of corresponding ITLs, in the system of FIG. 1.

Attention is first drawn to FIG. 1 showing a schematic illustration of a system 100 for accessing data in an external virtual memory, and also occasionally to FIG. 2 illustrating a host associated with a few volumes by means of corresponding ITLs, in accordance with the prior art. The system includes one or more hosts 101-1 to 101-*n*, hosting each of one or more applications (not shown) and coupled to a storage system 102 for accessing data residing in an external storage system. The data resides in volumes (denoted $V_s$, not shown in FIG. 1) of external virtual memory (say spread across virtual disk units 104-1 to 104-*n*). Note that $V_s$ is storage system/vendor specific and in certain cases it is unanimous with Global Unit ID (GUID) or with a volume serial number.

An application (not shown) in Host 101-1 accesses a volume of external virtual memory 104-2 through a handle being for example ITL where I stands for initiator port, say 108-1 and T stands for a target port, say (109-2), and L stands for LUN, say 110-1. As is well known, the host may employ a plurality of initiator ports each of which is associated to one or more applications. The virtual memory may employ a plurality of target ports typically according to the number of volumes spread across the virtual memory where each pair of corresponding initiator port and target port is connected by means of unique Logical Unit Number—LUN. Thus, for example, initiator port 108-*n* and target port 109-(*n*−1) are connected through unique LUN (110 *n*−1). This can be illustrated, for example, also with reference to FIG. 2 where application 202-*n* of Host 101-2 accesses (through initiator port 108-1) any of volumes $V_{s1}$-$V_{s4}$ (201-1 to 201-4) of external virtual memory 104-2 through respective target ports 109-2 (A)-(D).

Note that whereas for convenience of explanation the link between the Initiator port and the Target port is marked by LUN, the latter is not a physical entity but rather it is a logical entity, e.g., an entry in a table that signifies that a connection from I to T is allowed and it is identified with that number. Note also that a plurality of LUNs may be associated with a given Target port.

The specified volumes may represent snapshots (each volume representing one or more snapshots) of data of a primary volume associated with the host. The snapshots are created in accordance with a pre-defined policy prescribed by the storage manager, e.g. 107 of FIG. 1).

Reverting now to FIG. 1, there are also shown host management modules 103-*i* each associated with its respective host 101-*i* operating under the control of Storage Administrator module 107 for providing handles viewed by the volumes and by the applications. As is well known, LUN is the identifier of a device which is being addressed by storage access protocol (e.g. SCSI protocol). As shown, for example, in FIG. 2, each of the specified volumes $V_{s1}$ to $V_{s4}$ (201-1 to 201-4) is accessible to the application $AP_n$ by means of respective unique LUN 203-1 to 203-4. It is thus evident that for an application to access data (utilizing an access protocol command, say SCSI) in a volume of virtual memory, an ITL that associates the application and the volume, is utilized. In the latter, I stands for the initiator port (say 108-1 in FIG. 2), T stands for target port of the volume (say 109 (2) B, in FIG. 2) and L stands for the unique LUN. ITL is an example of a volume viewable handle. From the perspective of the host side, the volume is viewable to the application by associating the handle (e.g. ITL) to the application by an application viewable volume $V_h$ allowing the application to access the associated volume. Note that the syntax of $V_h$ is operating system specific. For MS windows operating systems for example, $V_h$ is indicated by a label of the form X: where X can be any single alphabet letter. Note that whereas for convenience of explanation the application viewable volume is indicated on a seemingly physical connection linking the host to the volume (see "Drive a:" in FIG. 2), the application viewable volume is of course a logical entity allowing the application to access volume.

Reverting now to FIG. 1, whenever an application wants to address a given volume for accessing data, it must request the storage manager 107 to allocate an ITL for associating a given initiator port of the application in the host to a target port of the designated volume in the virtual external memory. The application will access the specified given volume by means of the application viewable volume $V_h$.

Figure 3:
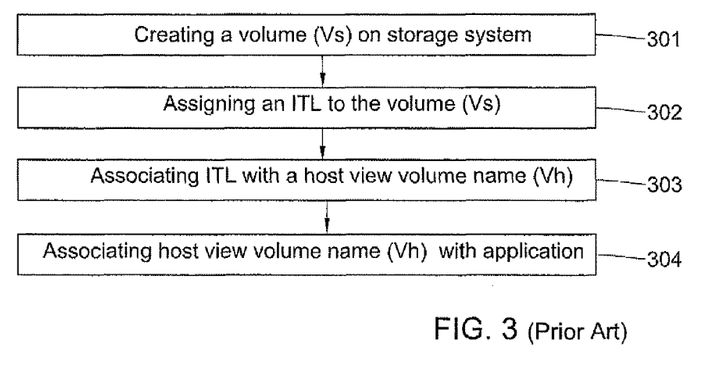
FIG. 3 is a flow chart illustrating a sequence of ITL provisioning, for accessing data in external virtual memory, in accordance with a prior art system.

Bearing this in mind, attention is drawn to FIG. 3 showing a flow chart illustrating a sequence of ITL provisioning for accessing data in volumes of external virtual memory, in accordance with a prior art system.

Thus, in stage 301 a volume $V_s$ is created on the external storage system. This operation is typically executed by a storage administrator (say 107 of FIG. 1) on the external storage.

Then in 302, an ITL (that was created by the storage administrator 107) is associated to the volume. This provisioning of ITL is typically executed by a storage administrator (107) and includes attaching the target port of the volume to the so generated LUN as well as attaching the LUN to the initiator port of the host. Note that the specified attachment typically involves human intervention (at storage administrator end) in order to permit the specified attachment of the LUN.

Then, in 303 the ITL is associated with $V_h$ (application viewable volume) allowing the application to view the volume. This operation is typically executed at the host (e.g. automatically by the operating system or by the host manager such as 103-*i* associated with the respective host, see FIG. 1). As specified above, the host viewable volume $V_h$, is for instance, in the ease of MS operating system, indicated by a label of the form X: where X can be any single alphabet letter. At stage 304, $V_h$ is associated to the application. This may be implemented by the host administrator (say 103-*i* of FIG. 2). The application on the host can now utilize $V_h$ as a handle through which it can access data (e.g. read, write) on volume $V_s$. Normally, security rules are imposed by the storage manager for instance only if the volume $V_s$ is a representative of a given snapshot of an application's primary volume of data, then the application can access the desired volume $V_s$ (through the respective $V_h$) and read the snapshot data or write data thereto.

In should be noted that logical volumes may be created automatically e.g. in accordance with a policy prescribed by the storage manager, for instance in the case of volumes which hold snapshots. Note that, in particular, in cases where a very large number of snapshots is to be maintained, this may entail that a very large number of snapshots for a particular volume exist whereas the application normally accesses very few snapshots at a time (out of the large number of created snapshots).

Thus, for each created snapshot, the whole provisioning cycle discussed above is executed involving the storage manager (e.g. 107 of FIG. 1 including human intervention—as discussed above) obviously posing an undue overhead when the number of snapshots is large. This stems from the fact that storage resources and access to storage is typically managed by a storage administrator, while application access to storage is managed by a host administrator. Accordingly in many prior art systems, in the provisioning procedure, an automatic generation of snapshots may be inhibited and moreover, external storage has to maintain an unnecessarily large number of ITLs, since applications access very few (if at all) snapshots at a time. In addition, the host has to maintain an unnecessarily large number of $V_h$ host viewable volumes which are generated in accordance with the created snapshots, notwithstanding the fact that the host accesses one or only a few (if any) concurrently.

Figure 4:
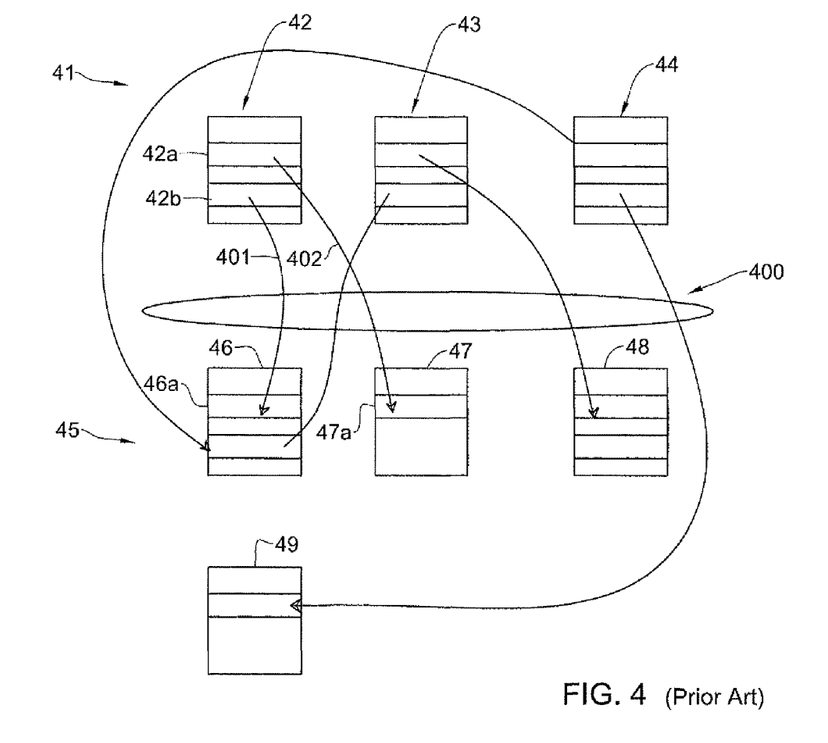
FIG. 4 illustrates, schematically, mapping between virtual and physical storages, in accordance with the prior art.

It should be also noted that whilst the snapshots reside in volumes of external virtual memory such as 104-2 of FIG. 2, this has nothing to do with the actual storage of the data in physical storage. For a better understanding of the foregoing, attention is drawn to FIG. 4 which illustrates schematically, mapping between the virtual and physical storage according to the prior art. Thus, as shown, virtual storage system 41 includes volumes 42, 43 and 44 which are mapped to physical storage disks of physical storage system 45. Thus, in this example, the physical storage includes disks 46 to 49. As shown by way of example only data chunks 42a and 42b in volume 42 may be mapped through pointers 401 and 402 (of mapping scheme 400) to different physical locations (cluster 46a of physical disk 46 and cluster 47a of physical disk 47). Reverting to FIGS. 1 to 3 above, when an application accesses through a given LUN data item(s) in a volume of external virtual memory, the data actually resides in a physical storage that is transparent to the application. Any write operation to a volume representing a snapshot will be reflected in a known per se manner in the physical storage actually storing the snapshot data.

Prior art references considered to be relevant as a background to the presently disclosed subject matter are listed below. Acknowledgement of the references herein is not to be inferred as meaning that these are in any way relevant to the patentability of the presently disclosed subject matter disclosed herein:

WO 2010/085228 entitled "Method and System for Dynamic Storage Tiering Using Allocate-On-Write Snapshots" discloses a system and method for dynamic storage tiering including creating a point-in-time copy of a virtual volume including a storage hot-spot, copying a virtual volume segment including the hot-spot from a first storage pool to a second storage pool and reconfiguring a logical block address mapping of the virtual volume to reference the virtual volume segment copy in the second storage pool.

U.S. Pat. No. 7,275,103 entitled "Storage path optimization for SANs" discloses embodiments of a system and method for rule-based proactive storage path optimization for SANs. Embodiments may evaluate paths between an application and its storage on a SAN based on current and/or historical path quality of service. Performance of alternative paths may be monitored to determine if a better path than a path currently in use is available. If a better path is determined, then the path may be switched to the better path. In one embodiment, one or more zones may be reconfigured to migrate to a different path. Path migration may be performed automatically without user intervention. Alternatively, a user may be given the option to manually migrate to a new path. Embodiments may proactively change paths between an application and its storage before path performance becomes a problem. Embodiments may be integrated with a SAN management system or, alternatively, may be standalone mechanisms.

US 2004/0068636 entitled "Virtual storage systems, virtual storage methods and methods of over committing a virtual raid storage system" discloses virtual storage systems, virtual storage methods and methods of over committing a virtual RAID storage system. According to one aspect, a virtual storage system includes a virtual storage space, a physical storage space, a mapping system configured to associate a plurality of addresses of the virtual storage space with respective addresses of the physical storage space and a controller configured to automatically remove a portion of the mapping system according to a prioritization protocol which specifies removal of portions of the mapping system according to an order.

There is a need in the art for providing a new system and method for accessing data in an external virtual memory.

SUMMARY OF THE INVENTION

In accordance with an aspect of the presently disclosed subject matter, there is provided a method for accessing data in an external virtual memory, comprising:
  (a) the host receiving from a storage manager a created handle for autonomous access of a volume, wherein the volume forms part of accessible volumes in the virtual memory;
  (b) the host autonomously provisions the handle to a selected volume from among the accessible volumes;
  (c) the host accessing the selected volume through the handle.

In accordance with an embodiment of the presently disclosed subject matter, there is further provided a method, wherein the host associating the handle to an application accommodated in the host so as to obtain an application viewed volume name, and wherein the host accessing the selected volume through the handle includes the application of the host accessing the selected volume through the application viewed volume name.

In accordance with an embodiment of the presently disclosed subject matter, there is still further provided a method, wherein the handle includes an initiator port for attaching to the host, a target port for attaching to the volume and LUN for identifying the handle.

In accordance with an embodiment of the presently disclosed subject matter, there is still further provided a method, wherein the host provisions the handle to a selected volume in compliance with security rules.

In accordance with an embodiment of the presently disclosed subject matter, there is still further provided a method, wherein the security rules stipulate that the autonomously accessible volume being representative of at least one snapshot of data associated only with a data volume of the host.

In accordance with an embodiment of the presently disclosed subject matter, there is still further provided a method, wherein the host receiving from the storage manager at least two created handles; and wherein the host autonomously provisioning the at least two handles to at least two volumes respectively; and wherein the host attaching the at least two handles to at least one application so as to obtain respective at least one application viewed volume names; and wherein the host accessing concurrently the at least two volumes through the at least one application viewed volume names.

In accordance with an embodiment of the presently disclosed subject matter, there is still further provided a method, wherein in response to application command the host autonomously detaching the handle from the selected volume and autonomously attaching by means of the handle the host application with a different volume from among the accessible volumes in compliance with security rules.

In accordance with an embodiment of the presently disclosed subject matter, there is still further provided a method, wherein the command is issued through Command Line Interface (CLI).

In accordance with an embodiment of the presently disclosed subject matter, there is still further provided a method, wherein the accessing includes reading and/or writing to the volume.

In accordance with an aspect of the presently disclosed subject matter, there is still further provided a method for accessing data in an external virtual memory, comprising: (a) the host receiving from a storage manager a created handle associated with a place holder volume for access to a volume, wherein the volume forms part of accessible volumes in the virtual memory; (b) the host autonomously provisions the handle to a selected volume from among the accessible volumes, utilizing the place holder volume; (c) the host accessing the selected volume through the handle and the place holder volume.

In accordance with an embodiment of the presently disclosed subject matter, there is still further provided a method, wherein the host associating the handle to an application accommodated in the host so as to obtain an application viewed volume name; and wherein the host accessing the selected volume through the handle and the place holder volume includes the application of the host accessing the selected volume through the application viewed volume name and the place holder volume.

In accordance with an embodiment of the presently disclosed subject matter, there is still further provided a method, wherein the host provisions the handle to a selected volume in compliance with security rules.

In accordance with an embodiment of the presently disclosed subject matter, there is still further provided a method, wherein the security rules stipulate that the autonomously accessible volume being representative of at least one snapshot of data associated only with a data volume of the host.

In accordance with an embodiment of the presently disclosed subject matter, there is still further provided a method, wherein the host autonomously provisions the handle to a selected volume from among the accessible volumes, utilizing the place holder volume includes the place holder volume inheriting a characteristic of the selected volume.

In accordance with an embodiment of the presently disclosed subject matter, there is still further provided a method, wherein the characteristic includes the volume size.

In accordance with an embodiment of the presently disclosed subject matter, there is still further provided a method, wherein in response to a command the host autonomously detaching the handle from the selected volume by detaching the place holder volume from the volume and autonomously attaching by means of the handle the host with a different volume from among the accessible volumes through the place holder and in compliance with security rules.

In accordance with an embodiment of the presently disclosed subject matter, there is still further provided a method, further comprising in case that the place holder volume is not attached to a volume, and in response to an attempt of the application to access a volume, returning to the application an error indication signifying that the place holder volume is not attached to a volume.

In accordance with an embodiment of the presently disclosed subject matter, there is still further provided a method, wherein the host receiving from the storage manager at least two created handles associated with respective at least two place holder volumes for accessing volumes; and wherein the host autonomously provisioning the at least two handles to at least two volumes utilizing the at least two place holder volumes respectively; and wherein the host attaching the at least two handles to at least one application so as to obtain respective at least one application viewed volume names; and wherein the host accessing concurrently the at least two volumes through the at least one application viewed volume names and the place holder volumes.

In accordance with an embodiment of the presently disclosed subject matter, there is still further provided a method, wherein the autonomously provisioning the at least two handles to at least two volumes includes the at least two place holder volumes inheriting the characteristic of the at least two volumes, respectively.

In accordance with an embodiment of the presently disclosed subject matter, there is still further provided a method, wherein the characteristic includes the volume size.

In accordance with an aspect of the presently disclosed subject matter, there is still further provided a method for facilitating access of data from an external virtual memory, comprising a storage manager creating at least one handle, a host manager provisioning the at least one handle to a respective at least one volume in compliance with security rules, and the host manager autonomously accessing the at least one volume through the at least one handle.

In accordance with an embodiment of the presently disclosed subject matter, there is still further provided a method, wherein the volume represents a snapshot.

In accordance with an aspect of the presently disclosed subject matter, there is still further provided a system for accessing data in an external virtual memory, comprising a host associated with a host manager being configured to receive from a storage manager a created handle for autonomous access of a volume, wherein the volume forms part of accessible volumes the virtual memory, the host manager being configured to autonomously provision the handle to a selected volume from among the accessible volumes, the host manager being configured to access the selected volume through the handle.

In accordance with an embodiment of the presently disclosed subject matter, there is still further provided a system, wherein the host manager being configured to associate the handle to an application accommodated in the host so as to obtain an application viewed volume name, and wherein the application of the host being configured to access the selected volume through the application viewed volume name.

In accordance with an embodiment of the presently disclosed subject matter, there is still further provided a system, wherein in response to application command the host being configured to autonomously detach the handle from the selected volume and autonomously attaching by means of the handle the host application with a different volume from among the accessible volumes in compliance with security rules.

In accordance with an aspect of the presently disclosed subject matter, there is still further provided a system for accessing data in an external virtual memory, comprising a host including host manager configured to receive from a storage manager a created handle associated with a place holder volume for access to a volume, wherein the volume forms part of accessible volumes in the virtual memory; the host manager being configured to autonomously provision the handle to a selected volume from among the accessible volumes, utilizing the place holder volume; the host manager being configured to access the selected volume through the handle and the place holder volume.

In accordance with an embodiment of the presently disclosed subject matter, there is still further provided a system, wherein the place holder volume inheriting a characteristic of the selected volume.

In accordance with an embodiment of the presently disclosed subject matter, there is still further provided a system, wherein in response to a command the host manager autonomously detaching the handle from the selected volume by detaching the place holder volume from the volume and autonomously attaching by means of the handle the host manager with a different volume from among the accessible volumes through the place holder and in compliance with security rules.

In accordance with an embodiment of the presently disclosed subject matter, there is still further provided a system, further comprising, in case that the place holder volume is not attached to a volume, and in response to an attempt to access a volume, returning an error indication signifying that the place holder volume is not attached to a volume.

In accordance with an aspect of the presently disclosed subject matter, there is still further provided a system for facilitating access of data from an external virtual memory, comprising a storage manager being configured to create at least one handle; a host manager being configured to provision the at least one handle to a respective at least one volume in compliance with security rules; and the host manager being configured to autonomously access the at least one volume through the at least one handle.

In accordance with an aspect of the presently disclosed subject matter, there is still further provided a computer program product that includes a storage storing computer code for accessing data in an external virtual memory, comprising a computer code portion for receiving from a storage manager a created handle for autonomous access of a volume, wherein the volume forms part of accessible volumes of said virtual memory; a computer code portion for autonomously provisioning the handle to a selected volume from among the accessible volumes; a computer code portion for accessing the selected volume through the handle.

In accordance with an aspect of the presently disclosed subject matter, there is still further provided a computer program product that includes a storage storing computer code for accessing data in an external virtual memory, comprising: a computer code portion for receiving from a storage manager a created handle associated with a place holder volume for access to a volume, wherein the volume forms part of accessible volumes in the virtual memory; a computer code portion for autonomously provisioning the handle to a selected volume from among the accessible volumes, utilizing the place holder volume; a computer code portion for accessing the selected volume through the handle and the place holder volume.

In accordance with an aspect of the presently disclosed subject matter, there is still further provided a computer program product that includes a storage storing computer code for facilitating access of data from an external virtual memory, comprising: a computer code portion for creating at least one handle; a computer code portion for provisioning the at least one handle to a respective at least one volume in compliance with security rules; and a computer code portion for autonomously accessing the at least one volume through the at least one handle.

BRIEF DESCRIPTION OF THE DRAWINGS

In order to understand the presently disclosed subject matter and to see how it may be carried out in practice, embodiments will now be described, by way of non-limiting example only, with reference to the accompanying drawings, in which.

DETAILED DESCRIPTION

Note that in the drawings and descriptions, identical reference numerals indicate those components or stages that are common to different examples.

Unless specifically stated otherwise, as apparent from the following discussions, it is appreciated that throughout the specification discussions utilizing terms such as receiving, provisioning, accessing, associating, attaching, identifying, detaching, reading, writing, creating or the like, include action and/or processes of a computer that manipulate and/or transform data into other data, said data represented as physical quantities, e.g. such as electronic quantities, and/or said data representing the physical objects.

Note that unless stated otherwise, in addition to or instead of what may be construed from the description herein, all technical and scientific terms used herein may have the same meaning as understood by one of ordinary skill in the art.

The operations of the host, host manager, storage manager and volume management module in accordance with the teachings herein may be performed by a computer specially constructed for the desired purposes or by a general purpose computer specially configured for the desired purpose by a computer program stored in a computer readable storage medium.

In accordance with certain embodiments of the presently disclosed subject matter, and as will be exemplified in greater detail below, there is provided an efficient method and system for snapshot provisioning in particular when a large number of snapshots are being created. The host manager can efficiently provide snapshots to applications minimizing the number of ITLs and the number of $V_h$ volumes, for instance according to the number of snapshots that should be accessed concurrently.

In accordance with certain embodiments of the presently disclosed subject matter, there is provided a method and system which separates between snapshot creation (still performed by storage administrator, say 107 of FIG. 1) and snapshot provisioning (performed e.g. by host manager 103) allowing automation of the snapshot creation process. Note that after having created the ITL (by storage management module 107) the provisioning of the ITL will be performed autonomously by the host manager e.g. manager module (103-i).

Figure 5A:
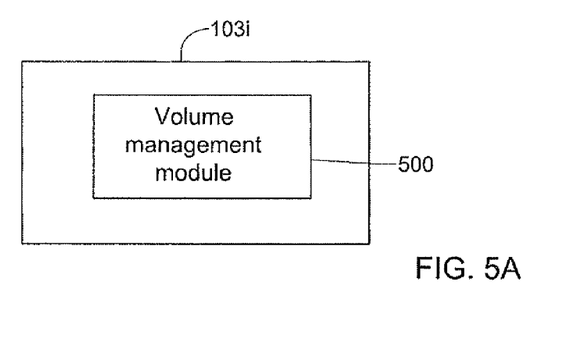
FIG. 5A illustrates a generalized block diagram of a host manager, in accordance with certain embodiments of the presently disclosed subject matter.

Bearing all this in mind, attention is now drawn to FIG. 5A depicting a generalized block diagram of a host manager, in accordance with certain embodiments of the presently disclosed subject matter. Thus, the host manager 103-i accommodates a volume manager for managing volumes (such as attaching to or detaching from a volume), in a manner that will be described in greater detail below. The presently disclosed subject matter is not bound by the block diagram structure of FIG. 5A.

Figure 5B:
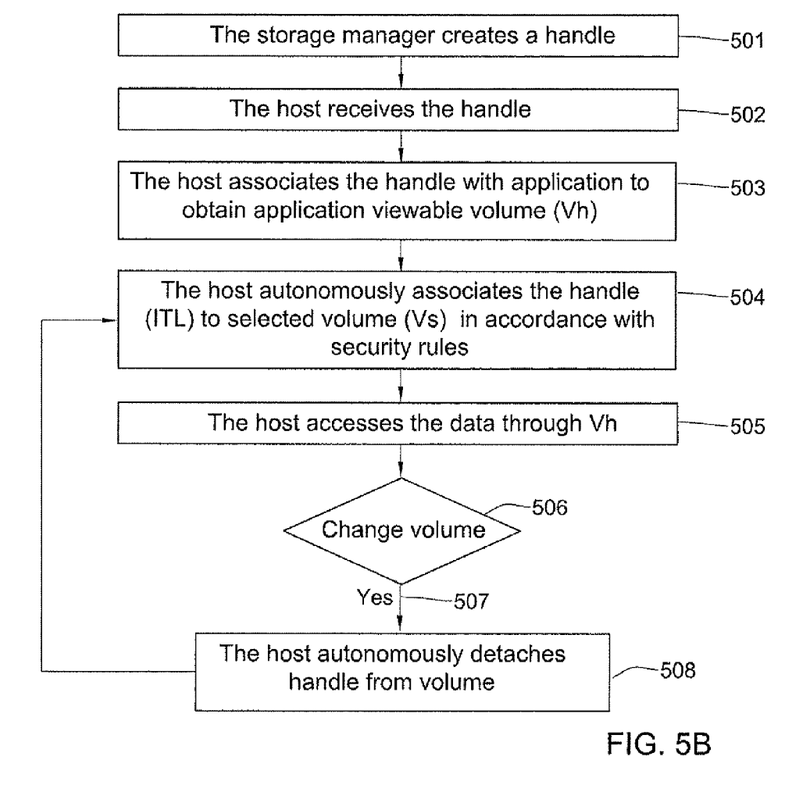
FIG. 5B illustrates a sequence of operations of provisioning a handle for accessing data in an external virtual memory, in accordance with a certain embodiment of the presently disclosed subject matter.

FIG. 5B illustrates a sequence of operations of provisioning a handle for accessing data in an external virtual memory, in accordance with a certain embodiment of the presently disclosed subject matter. The operational stages of FIG. 513 may be implemented for example by the volume management module 500 of FIG. 5A.

At stage 501, the storage manager creates a unique handle or handles (including a unique LUN) that will enable the host to access volumes on an external virtual memory. If desired, more than one handle is provided if the host requires to access more than one volume (e.g. snapshot) concurrently.

At stage 502, the host manager receives from a storage manager the created unique handle (or handles) for autonomously provisioning of access to volume(s) by the host.

At stage 503, the host manager associates the handle to an application so as to obtain an application viewed volume name (denoted $V_h$).

At stage 504, the host manager provisions the handle to a selected volume by autonomously associating (attaching) the handle from a desired initiator port at the host side, to a target port of a selected volume from among the accessible volumes through the specified unique LUN. The selected volume must comply with security rules, for instance, only if the selected volume is representative of a given snapshot of a primary volume of data associated with the host, then the application can access the selected volume (representative of the snapshot of interest). Access in accordance with certain embodiments includes reading data from the volume (indicative of the snapshot) and/or writing data thereto.

At stage 505, the application of the host accesses the selected volume through the application viewed volume name $V_h$.

In cases where the application wishes to access another volume (stages 506 and 507), the host manager autonomously provisions the handle to another selected volume. This includes detaching the handle from the specified volume 508, and attaching it to the other desired volume (reverting to stage 504, this time with a different volume). Obviously the attachment to another selected volume should also comply with the specified security rules. Note that the application will utilize the application viewable volume $V_h$ (provided thereto at stage 503) for accessing the desired volume.

Note also that in accordance with certain embodiments, apart from the creation stage 501 (performed at the storage manager end), the provisioning stages 502 to 508 are all performed at the host manager end.

In accordance with certain embodiments, the storage manager can create more than one handle for each host (or application), allowing thus simultaneous access from the host to corresponding at least two volumes. The provisioning of each of the specified handles is as described with reference to FIG. 5, above.

In accordance with a certain embodiment, the security rules include:
(i) Host manager cannot grant access to storage volumes other than to snapshot volumes which are snapshots of volumes it has access to already; and
(ii) Space allocation to snapshots and snapshot creation itself is controlled by the storage manager.

Note that the specified security rules are by no means binding and may vary depending upon the particular implementation.

Figure 6A:
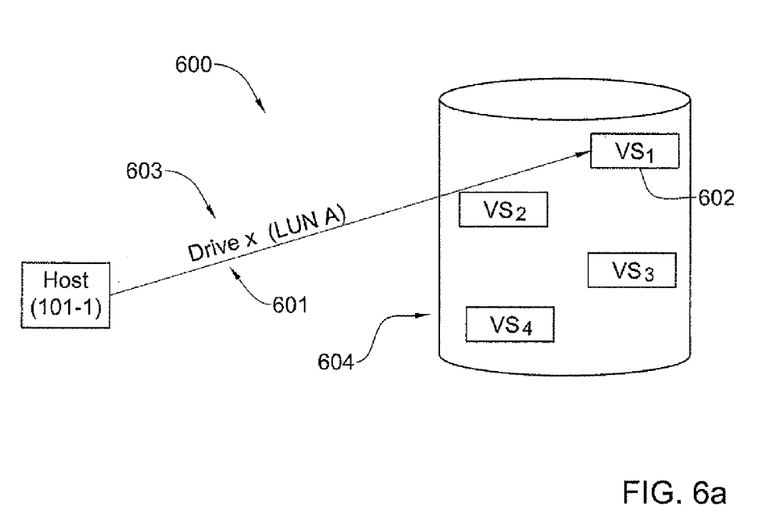
FIGS. 6A-B illustrate graphically provisioning of a handle, in accordance with certain embodiments of the presently disclosed subject matter.
Figure 6B:
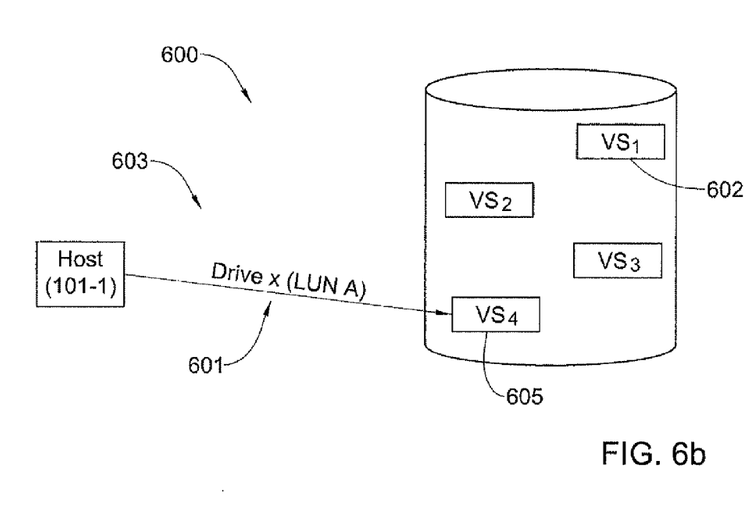

Attention is now directed to FIGS. 6A-B illustrating handle provisioning, in accordance with certain embodiments of the presently disclosed subject matter. Thus, in FIG. 6A, the host manager (not shown) provisions handle 601 for association between an application in the host 1014 to a given volume. The handle 601 is identified by the application as application viewed volume name (labeled by this example as a Drive: X 603, where X being representative of an alphabetic letter)— see e.g. stage 503 of FIG. 5. The volume $V_{s1}$ 602 of virtual memory 604 is accessed through handle (ITL). Note that the provisioning of the handle from the host application to the desired volume $V_{s1}$ 602 is performed autonomously by the host manager, e.g. in accordance with the sequence described with reference to FIG. 5. The handle is identified by a unique LUN (designated in FIG. 6A as $LUN_A$) and the application in the host accesses the specified volume $V_{s1}$ 602 through a host viewable volume (labeled as X: 603). Note that the unique LUN and the application viewable volume (labeled as X: are both logical and do not stand for a physical link.

Turning now to FIG. 6B, in cases where the application seeks to access a different volume, say $V_{s4}$ 605 (which complies with security rules discussed above), the host manager, autonomously, and without the involvement of the storage manager, will provide the required connection, which includes detaching the handle 601 (connection) from volume $V_{s1}$ 602 and re-attaching it to a different volume designated as $V_{s4}$ 605. From the standpoint of the application, the latter will access the newly attached volume utilizing the same application viewable volume $V_h$ (identified by the same label Drive X: 603) and using the same unique $LUN_A$ of the specified handle 601.

Note that in accordance with certain embodiments, where an application or host wishes to access more than one volume concurrently, then the storage module may create and assign to the host corresponding more than one handle (identified by the host applications by respective applications viewable volume labels, such as X:, Y: etc.). This will allow access to each volume through the respective handle. Thus, for example, an application can access a given snapshot through application viewable volume name X: and concurrently access a different snapshot utilizing the other unique application viewable volume name that is assigned thereto Y:.

It is accordingly appreciated that in accordance with certain embodiments of the presently disclosed subject matter, there is provided a handle provisioning method e.g. for allowing applications to access volumes (e.g. representing snapshots) such that:
(1) The number of ITLs that need to be maintained is that of the number of snapshot volumes that need to be accessed concurrently rather than the number of snapshots in a given volume.
(2) The number of $V_h$ volumes that need to be maintained is that of the number of snapshot volumes that need to be accessed concurrently by the application rather than the number of snapshots in a given volume.
(3) The number of operations that storage administrator has to perform to create a handle (and which will be utilized by the host for provisioning access to snapshots) is proportional to the number of snapshot volumes that need to be accessed concurrently by the application rather than the number of snapshots in the storage system.
(4) The number of operations that host administrator has to perform to provision a snapshot to an application is proportional to the number of snapshot volumes that need to be accessed concurrently by the application rather than the number of snapshots in a volume.

Figure 7:
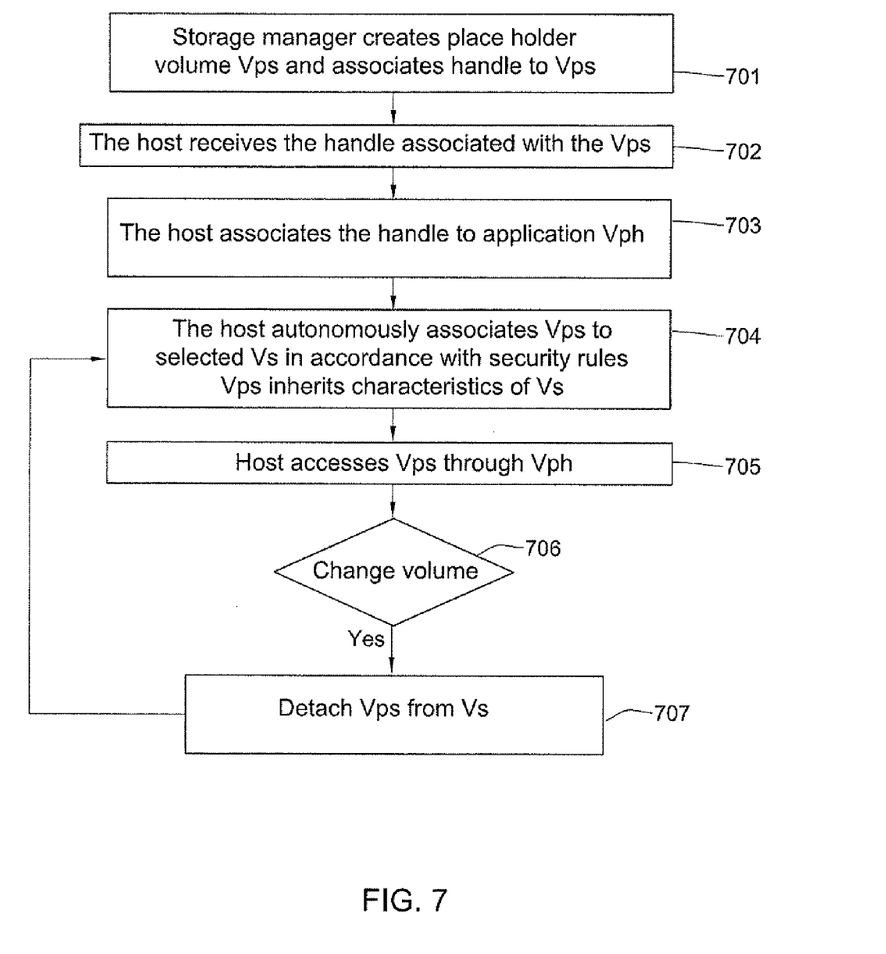
FIG. 7 illustrates a sequence of operations of provisioning a handle for accessing data in an external virtual memory, in accordance with a certain embodiment of the presently disclosed subject matter.
Figure 8:
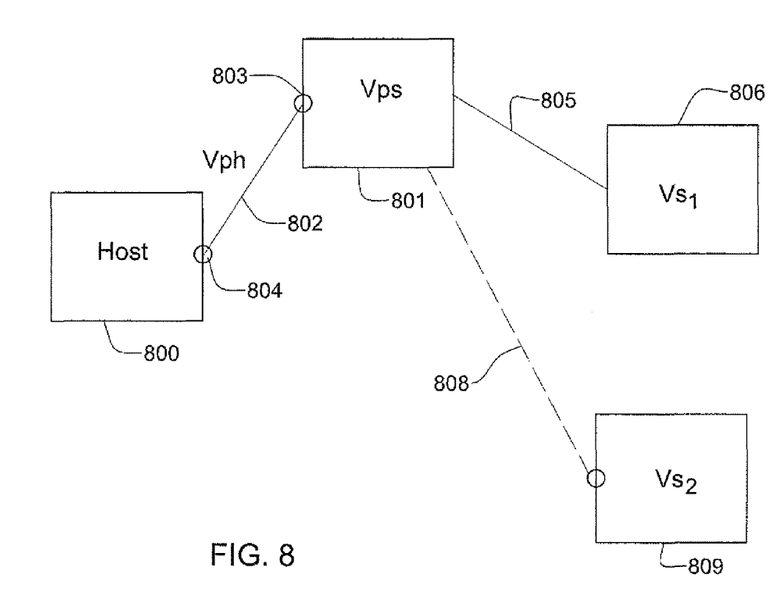
FIG. 8 illustrates graphically provisioning of a handle, in accordance with the embodiment of FIG. 7.

Turning now to FIG. 7, it illustrates a sequence of operations for provisioning a handle, for accessing data in an external virtual memory in accordance with a certain embodiment of the presently disclosed subject matter, and to FIG. 8 illustrating, graphically, provisioning of a handle, in accordance with the embodiment of FIG. 7.

In accordance with this embodiment, the storage manager (e.g. 107 of FIG. 1) creates (701) a new type of volume denoted place holder volume $V_{ps}$ (see e.g. 801 of FIG. 8). The characteristics of $V_{ps}$ are in accordance with certain embodiments, as follows:
1. Each $V_{ps}$ in the system is uniquely identified by volume name and/or by some unique Global Unit ID (GUID) like every other volume in the system
2. There is no space allocated to $V_{ps}$ volumes; its size is zero. In accordance with other embodiments it may have a different value.

Each $V_{ps}$ may be associated with a set of ITLs through which it facilitates access to a set of hosts like a regular volume $V_s$. For instance, in cases where a few applications (each associated with a respective initiator port of a host) wish to access a common volume (utilizing to this end the specified place holder volume $V_{ps}$), there will be allocated a few ITLs for the $V_{ps}$.

3. Although $V_{ps}$ may be associated with a set of ITLs, the storage manager will honor only query SCSI commands to this volume; otherwise it returns a status of "volume offline" i.e. no read/write operations can be performed to $V_{ps}$. This situation is changed when a specific operation to be later discussed is performed on the volume.
4. $V_{ps}$ volumes are visible also through storage manager particular management commands (CLI) and GUI.
5. $V_{ps}$ volumes are associated on the host side with corresponding $V_{ph}$ As readily noted from characteristic 3 above, the storage manager generates one or more unique handles (e.g. ITLs) (see, for example, 802 of FIG. 8) and associates the handle or handles to the place holder volume (e.g. handle 802 is associated to the place holder 802 through target port 803).

Reverting to FIG. 7, in step 702, the host (e.g. host manager associated with host 1014 of FIG. 1) receives the handle (e.g. 802) and associates the host side with corresponding application viewable handle $V_{ph}$ (step 703) e.g. in Windows® operating system an alphabetic character, allowing the application to access the place holder volume $V_{ps}$. Note that the association of the handle 802 to the host (through initiator port 804 and to $V_{ps}$ 801 through target port 803) is performed by the storage manager. The Unique LUN of handle 802 is viewable from $V_{ps}$. As specified above, the LUN and the application viewable handle label (X:) are logical entities and do not stand for a physical link.

Note also that at this stage, when the host accesses the place holder volume 801, an error status (e.g. "volume off-line") is returned considering that the place holder volume 801 is not as yet attached to any of the volumes ($V_{si}$), all as will be discussed in greater detail below.

Turning now to step 704, the host attaches the place holder volume $V_{ps}$ to a selected volume $V_{si}$, in compliance with security rules, as will be described in greater detail below. Thus, for example, and as shown in FIG. 8, the host attaches (805) volume $V_{ps}$ (803) to volume $V_{s1}$ 806, and consequently $V_{ps}$ inherits all properties of $V_s$, i.e. it assumes the size and GUID of $V_s$.

By $V_{ps}$ inheriting the properties of $V_{si}$, the host is practically associated to the selected volume $V_{si}$ since $V_{ps}$ has inherited characteristics that by this embodiment include the volume size of $V_{si}$. Note that the connection between $V_{ps}$ and $V_{si}$ is logical, and accordingly once inheriting the characteristic of the specified $V_{si}$, the host can access the latter volume through the target port 803 that is attached to $V_{ps}$.

The host now accesses 705 (e.g. read and or write) the volume through the $V_{ph}$ associated with the $V_{ps}$ that has inherited the properties of $V_{s1}$. Access includes by one example read from and/or write to the volume.

If the host wishes to access a different volume 706 (in accordance with the security rules prescribed by the storage manager), it detaches the handle from the previous volume and reattaches it to another volume. By this embodiment, the volume detaches the connection between $V_{ps}$ and $V_{s1}$ 707 and attaches $V_{ps}$ to a different volume (in compliance with the security rules) say $V_{s2}$ (704). Accordingly, $V_{ps}$ will inherit the characteristics of $V_{s2}$ (e.g. in accordance with certain embodiments, the volume size) and now the host can access $V_{s2}$ through $V_{ph}$ (which, as may be recalled, is fixedly associated to $V_{ps}$). This is illustrated by way of example with reference to FIG. 8, where $V_{ps}$ is attached (808) to $V_{s2}$ (809).

Having explained an exemplary sequence of operations with reference to FIGS. 7 and 8, there follows a list of commands for attaching $V_{ps}$ to $V_s$, free $V_s$ and list place holders. The presently disclosed subject matter is not bound by this exemplary list of commands, which is provided for illustrative purposes only.

The following set of operations can be performed on $V_{ps}$:
1. Attach $V_{ps}$, $V_s$. This command attaches $V_{ps}$ to $V_s$. When this operation is executed the following happens.
  a. $V_{ps}$ inherits all properties of $V_s$, i.e. it assumes the size and GUID of $V_s$.
  b. $V_s$ becomes accessible to servers on all Ins defined for $V_{ps}$. I.e. Read and write operations to the corresponding $V_{ph}$ will be directed to the $V_s$ associated with the corresponding $V_{ps}$ and will be executed based on $V_s$ access permissions (read only or read/write). Note: for some operating systems, this needs to be accompanied by a rescan command.
2. Free $V_s$. This command detaches $V_{ps}$ from $V_s$. $V_{ps}$ returns to its original state as specified in the beginning of this section and the access it facilitated to $V_s$ is lost
3. List place_holders. This command lists $V_{ps}$ volumes. List all $V_{ps}$ their GUID and ITLs and, if associated, the GUID and size of the corresponding $V_s$.

In accordance with certain embodiments, the host has permitted actions, for instance (i) list all $V_{ps}$ which may include receiving also the handle identification (input port, target port and dedicated LUN) as well as volume ($V_{si}$) size that is attached to the $V_{ps}$ or volume off-line in cases where the $V_{ps}$ is not attached to any of the volumes.

Note that there may be more than one $V_{ps}$ allocated by the storage manager to the host, facilitating thus access of the host to a few volumes concurrently. For example, there may be hundreds of volumes (each with hundreds of snapshots,)

but perhaps only few of the specified volumes may be accessed concurrently and accordingly a given number of $V_{ps}$ will be allocated by the storage manager for facilitating concurrent access to a given number of volumes.

Turning to the security rules, in accordance with certain embodiments, they include the following:

(i) The creation of $V_{ps}$ volumes can be performed by invoking appropriate command(s) at the storage manager console and by permission of the storage manager (e.g. 107 of FIG. 1)

(ii) The attach and detach commands can be executed at the host side through inbound CLI and are subject to the following conditions:

a. CLI can be directed only to $V_{ph}$ visible by the host b. Attachment (between $V_{ps}$ and selected $V_{si}$) can only be made to those volumes which comply with a given rule, for instance only to $V_{si}$ representing a snapshot of the primary volume accessible by the host. This may be implemented for instance by allowing attachment only if the I part (of an ITLs of $V_{ps}$—) is the same as the I part of one of the ITLs of a volume representing a snapshot of a primary volume accessible by the host.

Note that the specified security rules are by no means binding and may vary depending upon the particular implementation.

Figure 9:
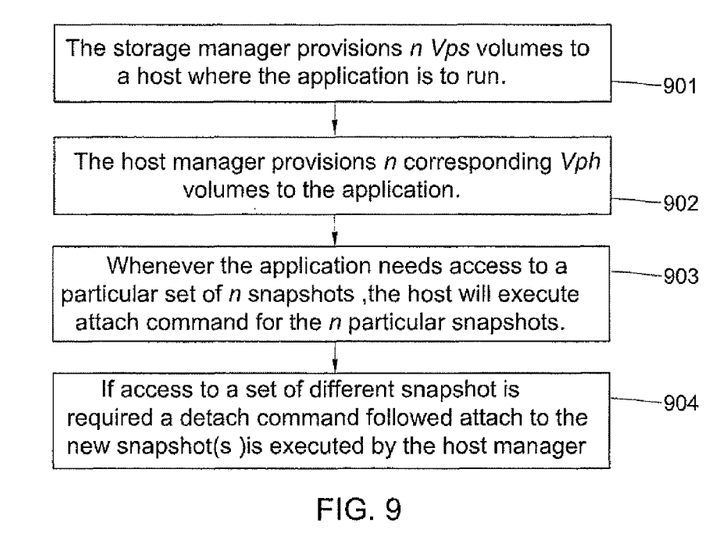
FIG. 9 illustrates a sequence of operations for dynamically associating a small number of n snapshots to an application, in accordance with a certain embodiment of the presently disclosed subject matter.

There follows a description of a sequence of operations with reference to FIG. 9, for dynamically associating a small number of n snapshots to an application, in accordance with a certain embodiment of the presently disclosed subject matter.

In step 901 the storage manager provisions n Vps volumes to a host where the application is to run.

In step 902 the host manager provisions n corresponding $V_{ph}$ volumes to the application.

Whenever the application needs access to a particular set of n snapshots the host (some applications with host privileges) will execute attach command for the n particular snapshots (903).

If access to a set of different snapshots is required, a detach command following the new snapshots is executed by the host manager (904).

In embodiments of the presently disclosed subject matter, fewer, more and/or different stages than those shown in FIGS. 5B, 7 and 9 may be executed. In embodiments of the presently disclosed subject matter one or more stages illustrated in FIGS. 5B, 7 and 9 may be executed in a different order and/or one or more groups of stages may be executed simultaneously. FIGS. 1, 5A, 6 and 8 illustrate a general schematic of the system architecture in accordance with an embodiment of the presently disclosed subject matter. Each module in FIGS. 1 and 5A can be made up of any combination of software, hardware and/or firmware that performs the functions as defined and explained herein. The modules in FIGS. 1 and 5A may be centralized in one location or dispersed over more than one location. In other embodiments of the presently disclosed subject matter, the system may comprise fewer, more, and/or different modules than those shown in FIGS. 1 and 5A.

The subject matter of the present application can have features of different aspects and/or embodiments described above or their equivalents, in any combination thereof.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer program product that include a storage storing computer code for executing the method of the presently disclosed subject matter.

While various embodiments have been shown and described, it will be understood that there is no intent to limit the presently disclosed subject matter by such disclosure, but rather, it is intended to cover all modifications and alternate constructions falling within the scope of the presently disclosed subject matter, as defined in the appended claims:

The invention claimed is:

1. A method for accessing data in an external virtual memory, comprising:

(a) a host receiving from a storage manager a created handle, identifiable by a value indicative of at least an application accommodated in said host, for autonomously allowing access to any volume selected by the host and allowed to be accessed by the host, wherein said volume forms part of accessible volumes in said virtual memory;

(b) the host autonomously provisions said handle to a selected volume from among said accessible volumes;

(c) the host accessing said selected volume through said handle; and (d) responsive to an application command, said host autonomously detaching said handle from said selected volume and autonomously attaching said handle with a different volume from among said accessible volumes, so as to allow the application to access said different volume through said handle, using the same value of said handle.

2. The method according to claim 1, wherein the host associating said handle to said application accommodated in said host so as to obtain an application viewed volume name, and wherein said (c) includes the application of said host accessing said selected volume through said application viewed volume name.

3. The method according to claim 1, wherein said handle includes an initiator port for attaching to the host, a target port for attaching to the volume and LUN for identifying the handle.

4. The method according to claim 1, wherein said host provisions said handle to said selected volume and to said different volume in compliance with security rules.

5. The method according to claim 4, wherein said security rules stipulate that the autonomously accessible volume being representative of at least one snapshot of data associated only with a data volume of said host.

6. The method according to claim 1, wherein said host receiving from the storage manager at least two created handles; and wherein said host autonomously provisioning said at least two handles to at least two volumes respectively; and wherein the host attaching said at least two handles to at least one application so as to obtain respective at least one application viewed volume names; and wherein said host accessing concurrently said at least two volumes through said at least one application viewed volume names.

7. The method according to claim 1, wherein said command is issued through Command Line Interface (CLI).

8. The method according to claim 1, wherein said accessing includes reading and/or writing to said volume.

9. A method for accessing data in an external virtual memory, comprising:

(a) a host receiving from a storage manager a created handle identifiable by a value indicative of a place holder volume configured for allowing access to any volume selected by the host and allowed to be accessed by the host, wherein said volume forms part of accessible volumes in said virtual memory;

(b) the host autonomously provisions said handle to a selected volume from among said accessible volumes, by attaching said place holder volume to said selected volume, without changing the value of said handle;

(c) the host accessing said selected volume using the same value of said handle and said place holder volume.

10. The method according to claim 9, wherein the host associating said handle to an application accommodated in said host so as to obtain an application viewed volume name; and wherein said (c) includes the application of said host accessing said selected volume through said application viewed volume name and said place holder volume.

11. The method according to claim 9, wherein said host provisions said handle to said selected volume in compliance with security rules.

12. The method according to claim 11, wherein said security rules stipulate that the autonomously accessible volume being representative of at least one snapshot of data associated only with a data volume of said host.

13. The method according to claim 9, wherein said (b) includes the place holder volume inheriting a characteristic of said selected volume.

14. The method according to claim 13, wherein said characteristic includes the volume size.

15. The method according to claim 9, wherein in response to a command said host autonomously detaching said handle from said selected volume by detaching the place holder volume from said selected volume and autonomously attaching by means of said handle, said place holder volume to a different volume from among said accessible volumes, so as to allow accessing said different volume through said handle, using the same value of said handle and in compliance with security rules.

16. The method according to claim 9, further comprising in case that said place holder volume is not attached to a volume, and in response to an attempt of said application to access a volume, returning to said application an error indication signifying that the place holder volume is not attached to a volume.

17. The method according to claim 9, wherein said host receiving from the storage manager at least two created handles associated with respective at least two place holder volumes for accessing volumes; and wherein said host autonomously provisioning said at least two handles to at least two volumes utilizing said at least two place holder volumes respectively;

and wherein the host attaching said at least two handles to at least one application so as to obtain respective at least one application viewed volume names; and wherein said host accessing concurrently said at least two volumes through said at least one application viewed volume names and said place holder volumes.

18. The method according to claim 17 wherein said autonomously provisioning said at least two handles to at least two volumes includes the at least two place holder volumes inheriting the characteristic of said at least two volumes, respectively.

19. The method according to claim 18, wherein said characteristic includes the volume size.

20. A method for facilitating access of data from an external virtual memory, comprising:

(a) a storage manager creating at least one handle, identifiable by a value indicative of at least an application accommodated in a host requesting said at least one handle;

(b) a host manager provisioning said at least one handle to a respective at least one volume in compliance with security rules;

(c) the host manager autonomously accessing said at least one volume through said at least one handle; and (d) responsive to an application command, said host manager autonomously detaching said handle from said selected volume and autonomously attaching said handle with a different volume from among said accessible volumes, so as to allow the application to access said different volume through said handle, using the same value of said handle.

21. The method according to claim 20, wherein said volume represents a snapshot.

22. A system for accessing data in an external virtual memory, comprising:

a host associated with a host manager being configured to receive from a storage manager a created handle, identifiable by a value indicative of at least an application accommodated in said host, for autonomously allowing access to any volume, selected by the host and allowed to be accessed by the host, wherein said volume forms part of accessible volumes said virtual memory;

the host manager being configured to autonomously provision said handle to a selected volume from among said accessible volumes;

the host manager being configured to access said selected volume through said handle; and responsive to an application command, said host manager being configured to autonomously detach said handle from said selected volume and to autonomously attach said handle to a different volume from among said accessible volumes, so as to allow the host to access said different volume through said handle, using the same value of said handle.

23. The system according to claim 22, wherein the host manager being configured to associate said handle to said application accommodated in said host so as to obtain an application viewed volume name, and wherein said application of said host being configured to access said selected volume through said application viewed volume name.

24. A system for accessing data in an external virtual memory, comprising:

a host including host manager configured to receive from a storage manager a created handle identifiable by a value indicative of a place holder volume configured for enabling access to any volume selected by the host and allowed to be accessed by the host, wherein said volume forms part of accessible volumes in said virtual memory;

the host manager being configured to autonomously provision said handle to a selected volume from among said accessible volumes, by attaching said place holder volume to said selected volume, without changing the value of said handle;

the host manager being configured to access said selected volume using the same value of said handle and said place holder volume.

25. The system according to claim 24, wherein upon provisioning said handler to said selected volume, the place holder volume inheriting a characteristic of said selected volume.

26. The system according to claim 24, wherein in response to a command said host manager autonomously detaching said handle from said selected volume by detaching the place holder volume from said selected volume and autonomously attaching by means of said handle, said place holder volume to a different volume from among said accessible volumes, so as to allow accessing said different volume through said handle, using the same value of said handle and in compliance with security rules.

27. The system according to claim 24, further comprising, in case that said place holder volume is not attached to a volume, and in response to an attempt to access a volume, returning an error indication signifying that the place holder volume is not attached to a volume.

28. A system for facilitating access of data from an external virtual memory, comprising:
   a storage manager being configured to create at least one handle, identifiable by a value indicative of at least an application accommodated in a host requesting said at least one handle;
   a host manager implemented as a combination comprising, at least, hardware and software, and being configured to provision said at least one handle to a respective at least one volume in compliance with security rules; and
   the host manager being configured to autonomously access said at least one volume through said at least one handle; and
   responsive to an application command, said host manager being configured to autonomously detach said at least one handle from said selected volume and to autonomously attach said at least one handle with a different volume, so as to allow the host to access said different volume through said at least one handle, using the same value of said at least one handle.

29. A computer program product that includes a non-transitory storage medium storing computer code for accessing data in an external virtual memory, comprising:
   (a) a computer code portion for receiving from a storage manager a created handle, identifiable by a value indicative of an application accommodated in a host requesting said handle, for allowing autonomous access to any volume selected by the host and allowed to be accessed by the host, wherein said volume forms part of accessible volumes of said virtual memory;
   (b) a computer code portion for autonomously provisioning said handle to a selected volume from among said accessible volumes;
   (c) a computer code portion for accessing said selected volume through said handle; and
   (d) a computer code portion for, responsive to an application command, autonomously detaching said handle from said selected volume and autonomously attaching said handle with a different volume from among said accessible volumes in compliance with security rules, so as to allow the application to access said different volume through said handle, using the same value of said handle.

30. A computer program product that includes a non-transitory storage medium storing computer code for accessing data in an external virtual memory, comprising:
   (a) a computer code portion for receiving from a storage manager a created handle identifiable by a value indicative of a place holder volume for allowing access to any volume selected by a host requesting said handle and allowed to be accessed by the host, wherein said volume forms part of accessible volumes in said virtual memory;
   (b) a computer code portion for autonomously provisioning said handle to a selected volume from among said accessible volumes, by attaching said place holder volume to said selected volume, without changing the value of said handle;
   (c) a computer code portion for accessing said selected volume using the same value of said handle and said place holder volume.

31. A computer program product that includes a non-transitory storage medium storing computer code for facilitating access of data from an external virtual memory, comprising:
   (a) a computer code portion for creating at least one handle, identifiable by a value indicative of an application accommodated in a host requesting said at least one handle;
   (b) a computer code portion for provisioning said at least one handle to a respective at least one volume in compliance with security rules; and
   (c) a computer code portion for autonomously accessing said at least one volume through said at least one handle; and
   (d) a computer code portion for, responsive to an application command, autonomously detaching said at least one handle from said selected volume and autonomously attaching said at least one handle with a different volume from among said accessible volumes in compliance with security rules, so as to allow the application to access said different volume through said at least one handle, using the same value of said at least one handle.

* * * * *